United States Patent
Rabellino et al.

(10) Patent No.: US 7,449,054 B2
(45) Date of Patent: Nov. 11, 2008

(54) AIR PURIFICATION SYSTEM WITH REGENERATIVE PURIFICATION UNITS

(75) Inventors: Lawrence A. Rabellino, Atascadero, CA (US); Charles H. Applegarth, San Luis Obispo, CA (US); Matthew D. Schlotterbeck, Atascadero, CA (US); Giorgio Vergani, Monza (IT)

(73) Assignee: SAES Pure Gas, Inc., San Luis Obispo, CA (US)

( * ) Notice: Subject to any disclaimer, the term of this patent is extended or adjusted under 35 U.S.C. 154(b) by 213 days.

(21) Appl. No.: 11/213,181

(22) Filed: Aug. 25, 2005

(65) Prior Publication Data
US 2005/0287050 A1    Dec. 29, 2005

Related U.S. Application Data

(62) Division of application No. 10/285,278, filed on Oct. 31, 2002.

(60) Provisional application No. 60/335,193, filed on Oct. 31, 2001.

(51) Int. Cl.
*B01D 53/04* (2006.01)
*B01D 53/26* (2006.01)

(52) U.S. Cl. .............................. 96/126; 96/128; 96/130

(58) Field of Classification Search .................... 96/121, 96/126, 127, 128, 130, 134–136, 142, 146; 423/230, 246, 247; 95/129, 139
See application file for complete search history.

(56) References Cited

U.S. PATENT DOCUMENTS

| | | | | |
|---|---|---|---|---|
| 4,127,395 A | * | 11/1978 | McKey et al. | 95/10 |
| 4,165,569 A | * | 8/1979 | Mackay | 34/416 |
| 4,343,629 A | * | 8/1982 | Dinsmore et al. | 95/93 |
| 4,444,727 A | * | 4/1984 | Yanagihara et al. | 422/223 |
| 4,548,044 A | * | 10/1985 | Sakai et al. | 62/46.2 |
| 4,579,723 A | | 4/1986 | Weltmer et al. | |
| 4,690,695 A | | 9/1987 | Doshi | |
| 4,976,942 A | | 12/1990 | Kitahara et al. | |
| 5,110,330 A | * | 5/1992 | Loughran | 96/117.5 |

(Continued)

FOREIGN PATENT DOCUMENTS

EP    0 438 282 A1    7/1991

(Continued)

OTHER PUBLICATIONS

Sup. Euro Search Rpt, Nov. 16, 2004, for EP02780546.

(Continued)

*Primary Examiner*—Frank M. Lawrence
(74) *Attorney, Agent, or Firm*—TIPS Group

(57) ABSTRACT

The invention teaches a purification system which uses a series of operations, in a single unit, to purify air, while extending the life of the purification units. Air is passed through a coarse water trap to remove liquid. The semi-dry air, is then passed through adsorbers, which remove the remaining moisture and all the carbon dioxide in a purification process. The present invention flows the air to be purified through adsorption columns twice, before and after passing the air through an oxygen catalyst unit. The flows of air are then rotated to a third column, which is thermally regenerating with the facilitation of a regeneration air supply from the purified air.

42 Claims, 11 Drawing Sheets

U.S. PATENT DOCUMENTS

| | | | |
|---|---|---|---|
| 5,202,096 A | 4/1993 | Jain | |
| 5,321,192 A | 6/1994 | Cottrel et al. | |
| 5,693,302 A | 12/1997 | Gary | |
| 5,906,675 A | 5/1999 | Jain et al. | |
| 5,914,455 A * | 6/1999 | Jain et al. | 95/96 |
| 6,077,488 A | 6/2000 | Jain et al. | |
| 6,093,379 A | 7/2000 | Golden et al. | |
| 6,113,869 A * | 9/2000 | Jain et al. | 423/219 |
| 6,280,691 B1 | 8/2001 | Homeyer et al. | |
| 6,511,640 B1 | 1/2003 | Kumar et al. | |
| 2003/0064014 A1 | 4/2003 | Kumar et al. | |

FOREIGN PATENT DOCUMENTS

| | | |
|---|---|---|
| EP | 0 799 633 A1 | 10/1997 |
| EP | 1 166 845 A1 | 1/2002 |
| GB | 2 160 439 A | 12/1985 |
| JP | 58064212 A2 | 10/1981 |

OTHER PUBLICATIONS

PCT Int'l Search Rpt, May 30, 2003.

* cited by examiner

Truth Table Operating Modes

| A | B | C | t (time period) |
|---|---|---|---|
| P-U | P-D | S | 1 |
| R | P-D | P-U | 2 |
| S | P-D | P-U | 3 |
| P-D | R | P-U | 4 |
| P-D | S | P-U | 5 |
| P-D | P-U | R | 6 |
| P-D | P-U | S | 7 |

P = Purify
R = Regen
S = Standby
U = Upstream
D = Downstream

FIG. 9

AIR PURIFICATION SYSTEM WITH REGENERATIVE PURIFICATION UNITS

CLAIM OF PRIORITY TO RELATED DOCUMENTS

This application is a Divisional of U.S. patent application Ser. No. 10/285,278 filed on Oct. 31, 2002, which claims priority to U.S. Provisional Patent Application No. 60/335,193 filed on Oct. 31, 2001, both of which are incorporated by reference.

FIELD OF THE INVENTION

The invention relates to air purification systems with regenerative purification filters in which the output air has a substantially similar ratio of normal nitrogen and oxygen air purified to 1 part per billion of impurity, in which the gases are not separated and recombined.

BACKGROUND OF THE INVENTION

Purified air is needed for a variety of applications, such as zero setting for analyzers, oxidizer gas for analyzers, and dilution air for emissions analysis. Increasingly lower standards for the quality of "normal" air requires improved quality "zero," oxidizer, and dilution air.

FIG. 1 is a depiction of a generic description of prior art air purification. Purified air is currently available mainly in limited quantities in bottled gas form from companies that supply both pure oxygen and nitrogen as well. The process of purifying air, as opposed to purifying a single type of gas, is usually far more expensive and energy intensive because the air has to be broken down into the gas components of nitrogen and oxygen, each gas separately purified, and then recombined in the bottle gas form. Such a system is depicted in prior art FIG. 2 and creates a high energy and monetary cost for purified air. FIG. 3 represents prior art a method of pressure swing adsorption and will be detailed below. FIG. 4 represents the membrane filter method, and is also well known to those skilled in the art. Both of the methods depicted in FIGS. 3 and 4 can severely affect the nitrogen and oxygen ratios of purified air resulting in unusable purified air for the purposes mentioned above.

For example, U.S. Pat. No. 5,931,022 to Deng, et. al. and assigned to BOC of Murray Hill, N.J., and incorporated herein by reference, teaches a way to regenerate the alumina thermal purification units by keeping them 180 degrees in phase. However, this system is limited because it only teaches how to remove carbon dioxide from air. This system also teaches the pressure swing adsorption method of impurity remove (herein PSA). As stated above, PSA has the drawback that the more aggressively the carbon dioxide is removed from the air to be purified, the more the air is at risk for a significant reduction in nitrogen levels. The reduction in nitrogen levels changes the nitrogen-to-oxygen ratio and makes the resulting purified air less suitable for the uses of calibration, analysis, and dilution. The details of the actual PSA method are well known to those skilled in the area of gas purification and do not need to be detailed here.

What is needed is a system in which purified air is created from normal air without the cost and energy expense of breaking the air into its component gases. What is also needed is an air purification system in which the oxygen and nitrogen ratios are maintained in order to provide purified air which is usable for calibration and other purposes.

Furthermore, it is desirable and cost effective to have such a purification system in which the purification units or adsorbers can regenerate themselves automatically, eliminating the need to replace the purification units.

Additionally, it is desirable to have an ability to regenerate the adsorption units without having to remove the units to permit the uninterrupted operation of the air purifiers. Finally, it is desirable to treat the air before purification, such that the purification is performed more efficiently and the life of the adsorption units and the oxygen catalyst units are extended.

SUMMARY OF THE INVENTION

The present invention provides the ability of a single unit to provide a purified air supply, where the ratio of $N_2$ to $O_2$ is unaltered, where the presence of $H_2$, sulfur containing compounds, water, carbon dioxide, THC, and $NO_x$ are removed to a concentration below 1 part per billion.

The purification system of the present invention uses a series of operations, in a single unit, to purify air. Air can be supplied from either the facility or an on-board oilless compressor. The compressed air is passed through a coarse water trap to remove liquid. The semi-dry air, which is usually less than 3000 ppm of water vapor, is then passed through adsorbers, which remove the remaining moisture and all the carbon dioxide in a purification process. The drying of the air before passing it through the adsorbers allows for greatly improved efficiency of air purification and extends the life of both the oxygen catalyst and the adsorption columns.

The present invention also flows the air to be purified through adsorption columns twice, before and after passing the air through an oxygen catalyst unit. The double adsorption process is generally described in a preferred embodiment as being in two different "flow directions," or "upstream" and "downstream" respectively. The oxidizing catalyst, which is heated to a temperature of approximately 300 degrees centigrade, converts carbon monoxide and hydrocarbons to $H_2O$ and $CO_2$. The newly converted $H_2O$ and $CO_2$ are then removed by the second pass through a second adsorption column in the second flow direction or downstream. The invention uses an adsorption column, which operates in an upstream manner in order to remove moisture and carbon dioxide, but also significantly improves the life of the oxidizing catalyst, and an adsorption column that removes further $CO_2$, water and $NO_x$ when purifying in a downstream function.

Furthermore, the present invention teaches thermal regeneration of adsorption units in a rotating fashion, by creating a rotating control of the flow of air, such that one adsorption unit is always regenerating while one is purifying in a upward flow and another is purifying in a downward flow. This process results in a system in which the adsorption units require significantly less maintenance. The purified air leaving the downstream adsorption column is both directed to an outlet and to a regeneration source supply. The regeneration supply of purified air is then directed to flow "backward" through the regenerating adsorption column. The adsorption column is heated creating conditions for regeneration of the column under low pressure. The re-contaminated air is then flowed out of the system through a regeneration vent.

BRIEF DESCRIPTION OF THE DRAWINGS

FIG. 9 is a sample flow/regeneration rotation cycle for adsorption units in an embodiment of the present invention with three purifying units.

GUIDE TO DEFINITIONS IN THE SPECIFICATION

The expressions "first flow direction" and "upstream" are interchangeable and generally mean the flow of the adsorption column to the oxygen catalyst unit, as are the expressions "second flow direction" and "downstream," and indicate the flow of air from the oxygen catalyst unit. As such, they describe the operation of the invention in a preferred embodiment and should not be considered limitations with regard to flow of air in an absolute direction, like upward, downward, west, away from the front etc., but are meant only to contrast the direction flow of air in the different adsorption columns in relation to the oxygen catalyst unit.

The expression "molecular sieve" is intended to apply to generic molecular sieves, and where indicated a brand or type of molecular sieve will be noted.

The expression "purification unit" is a generic descriptive term for the adsorption column unit as implemented in a preferred embodiment of the invention and is detailed below.

The expression "first flow connection" generally refers to the intake of an adsorption column, however, because there are multiple directional flow capabilities of the adsorption units in the present invention in a preferred embodiment, a more generic expression is used to denote this structure. Similarly, for the expression "second flow connection," is substituted for and would normally would refer to the outflow on an adsorption column.

DETAILED DESCRIPTION OF THE DRAWINGS

Figure 1:
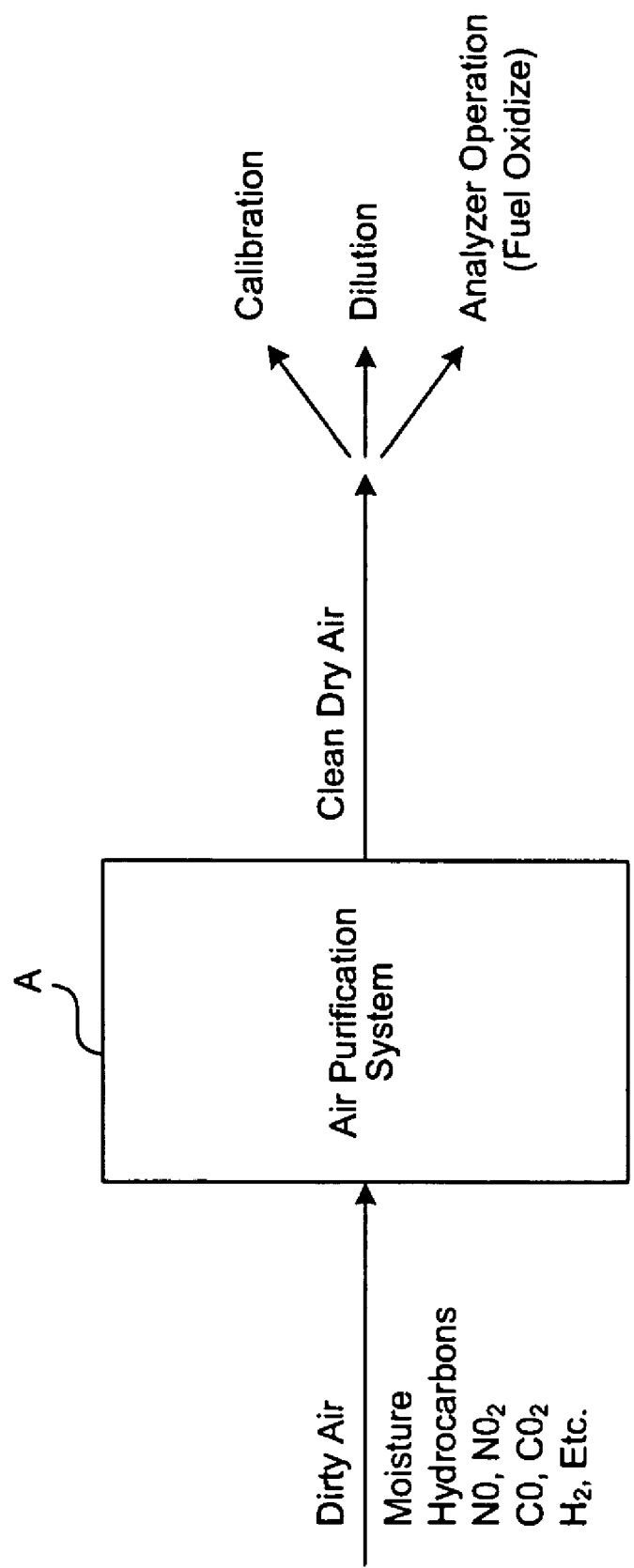
FIG. 1 is an illustration of the prior art process of air purification.
Figure 2:
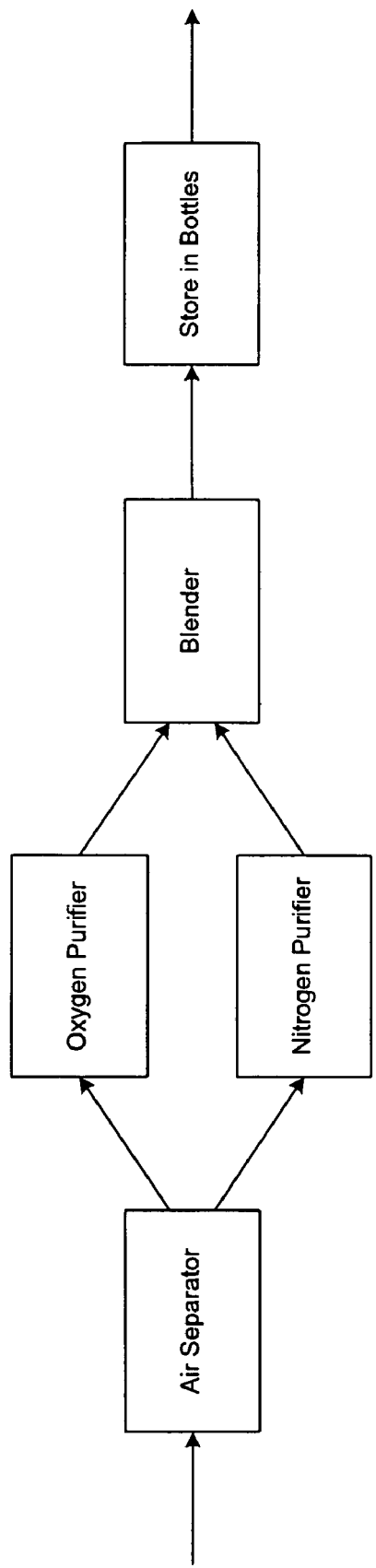
FIG. 2 is an illustration of the prior art process of separating gases and recombining them.
Figure 3:
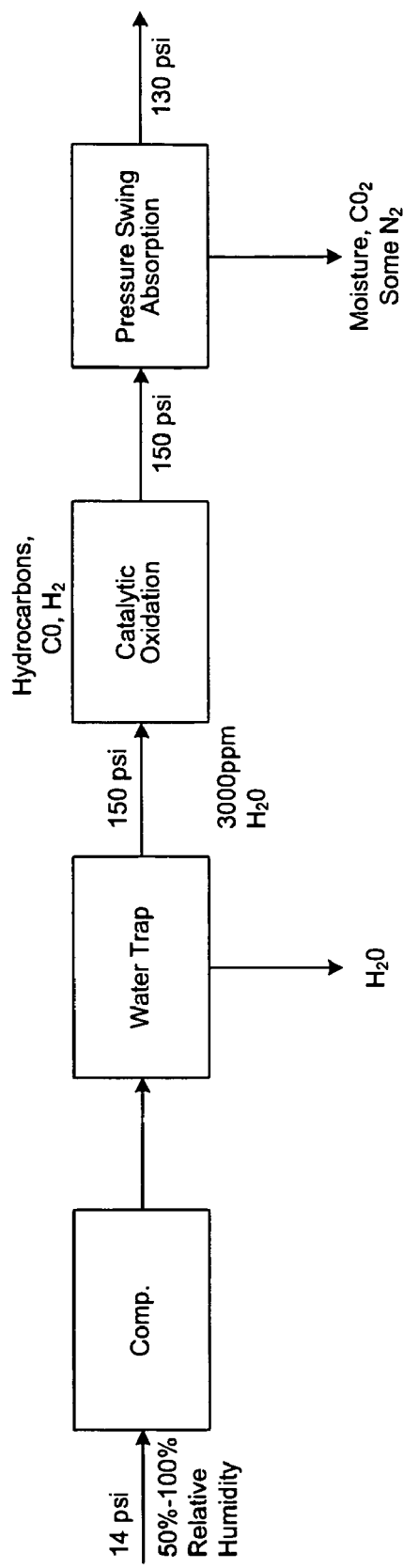
FIG. 3 is the prior art process of pressure swing adsorption method for air purification.
Figure 4:
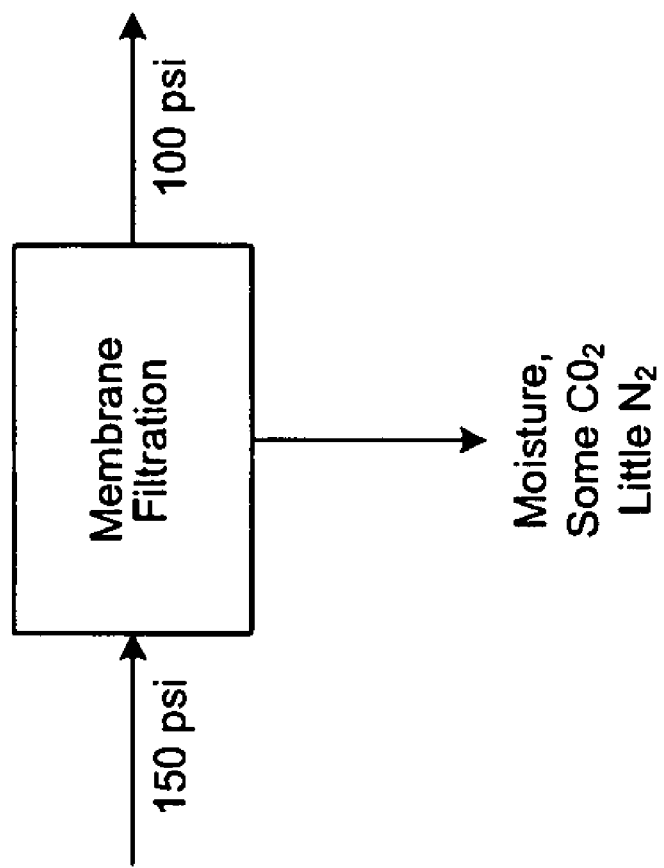
FIG. 4 is the prior art process of the membrane filtration process of air purification.
Figure 5:
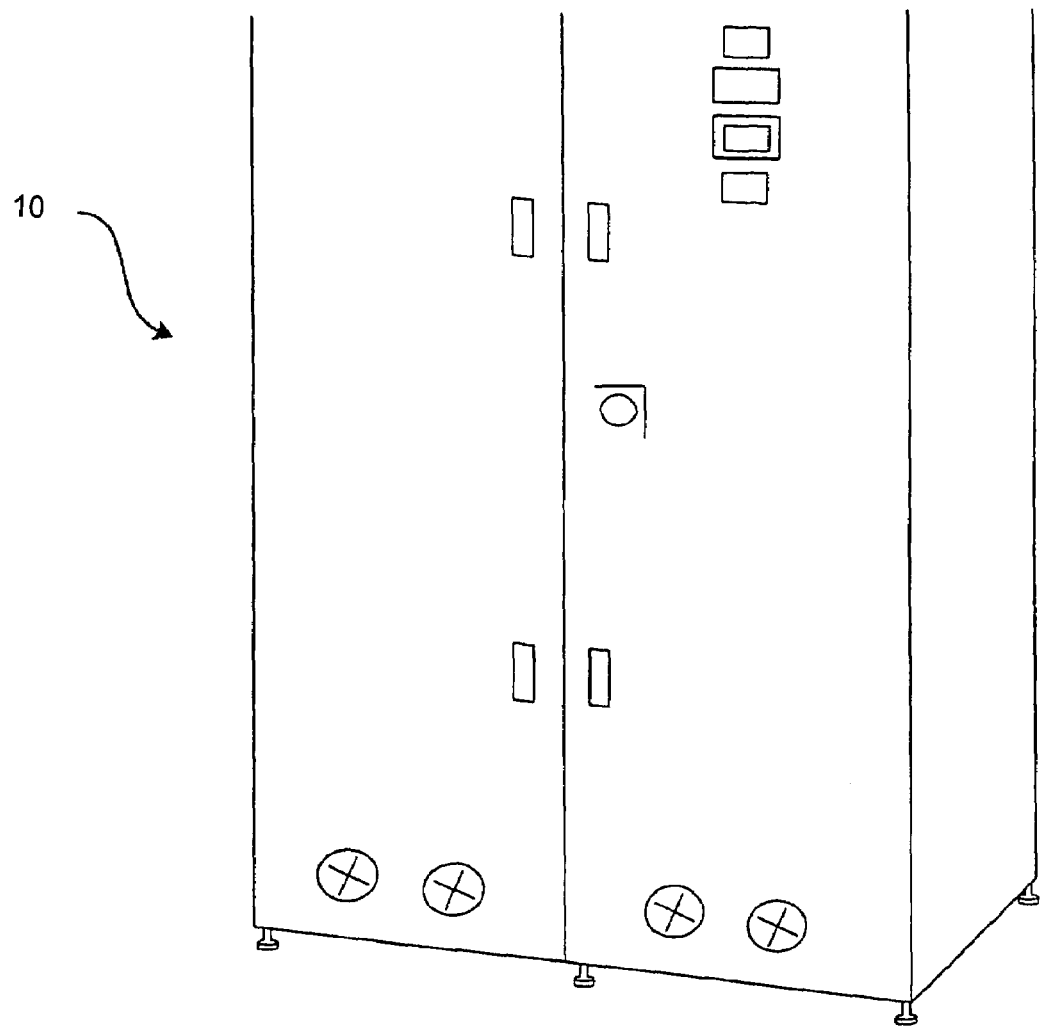
FIG. 5 is a container for the present invention.
Figure 6:
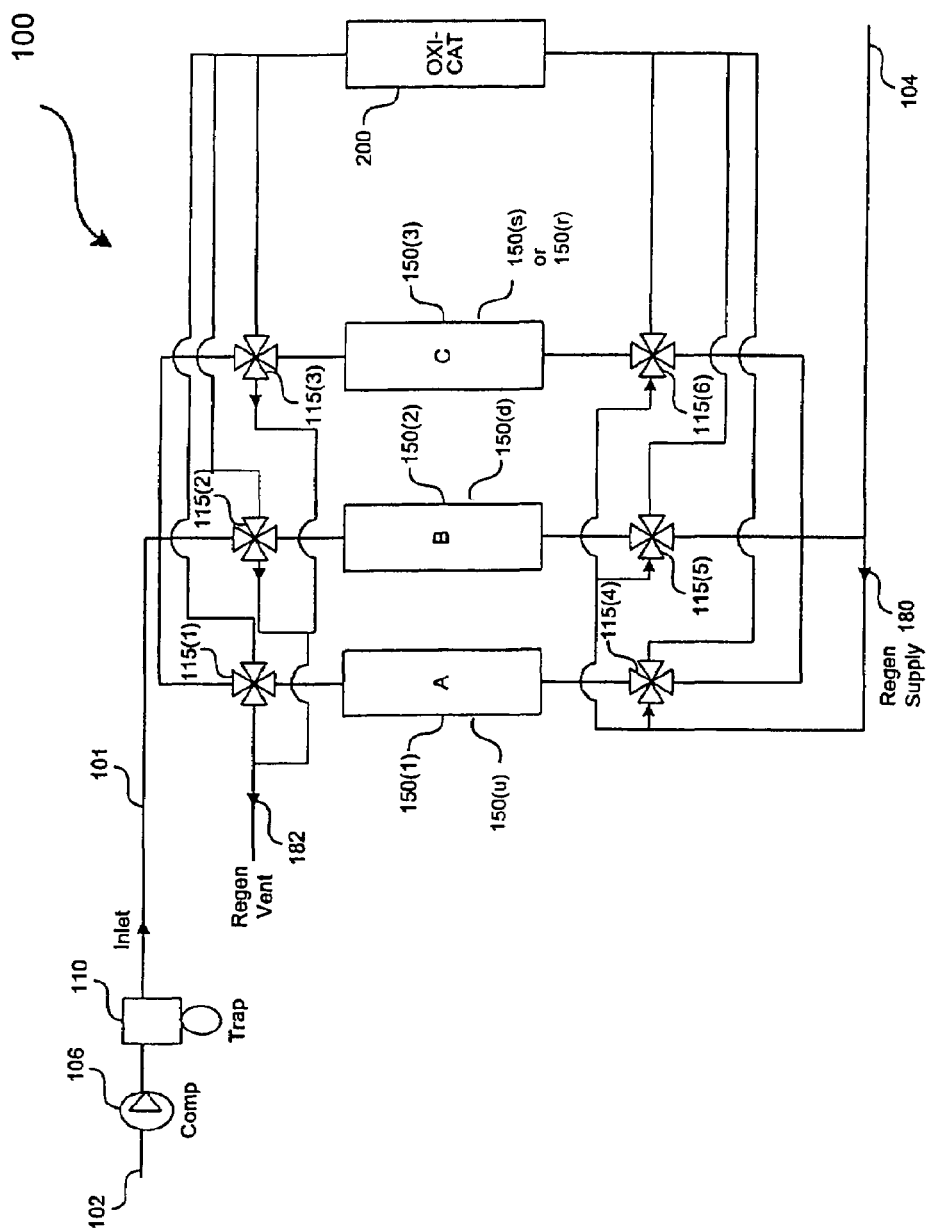
FIG. 6 is a system diagram of an embodiment of the present invention in the inactive state.

FIGS. 1-4 were discussed above with reference to the prior art. FIG. 5 depicts a sample cabinet unit 10 for housing the present invention in a preferred embodiment. Referring now to FIG. 6, a detail of one of the embodiments of the present invention in an inactive state is shown. The air purification system 100 is comprised of air purification tubing 101, an inlet 102, and an outlet 104, as well as an optional compressor 106 and water trap 110. Also included are at least three types of adsorption column units 150(upstream-u), 150(downstream-d) and 150(regen/s-r), A 150(1), B 150(2) and C 150(3), which will be described in detail below, but include a molecular sieve for removing impurities from air. For FIG. 6, column A 150(1) will adsorb upstream 150($u$), column B 150(2) will adsorb downstream 150($d$), and column C 150(3) will be either in standby mode 150($s$) or regenerating 150($r$). However, there are alternate embodiments where any of the columns can adsorb either upstream, downstream, or regenerate, which will be described in detail below.

Also included in air purification system 100 is an oxygen catalyst unit 200, which will be described in detail below. The oxygen catalyst unit 200 is generally kept at approximately 300 degrees centigrade in a preferred embodiment, as that is a preferred temperature for changing CO and hydrocarbons into water and carbon dioxide. The air flow is controlled by a series of valves 115($n$), which in a preferred embodiment are 4-way diverter valves and are connected to the tubing 101 throughout the system 100. The invention also includes a regeneration air supply intake 180 and a regeneration air vent 182. As can be appreciated by those skilled in the art, other types of valves would be appropriate in relation to the particular installation of the purification system 100.

Figure 7:
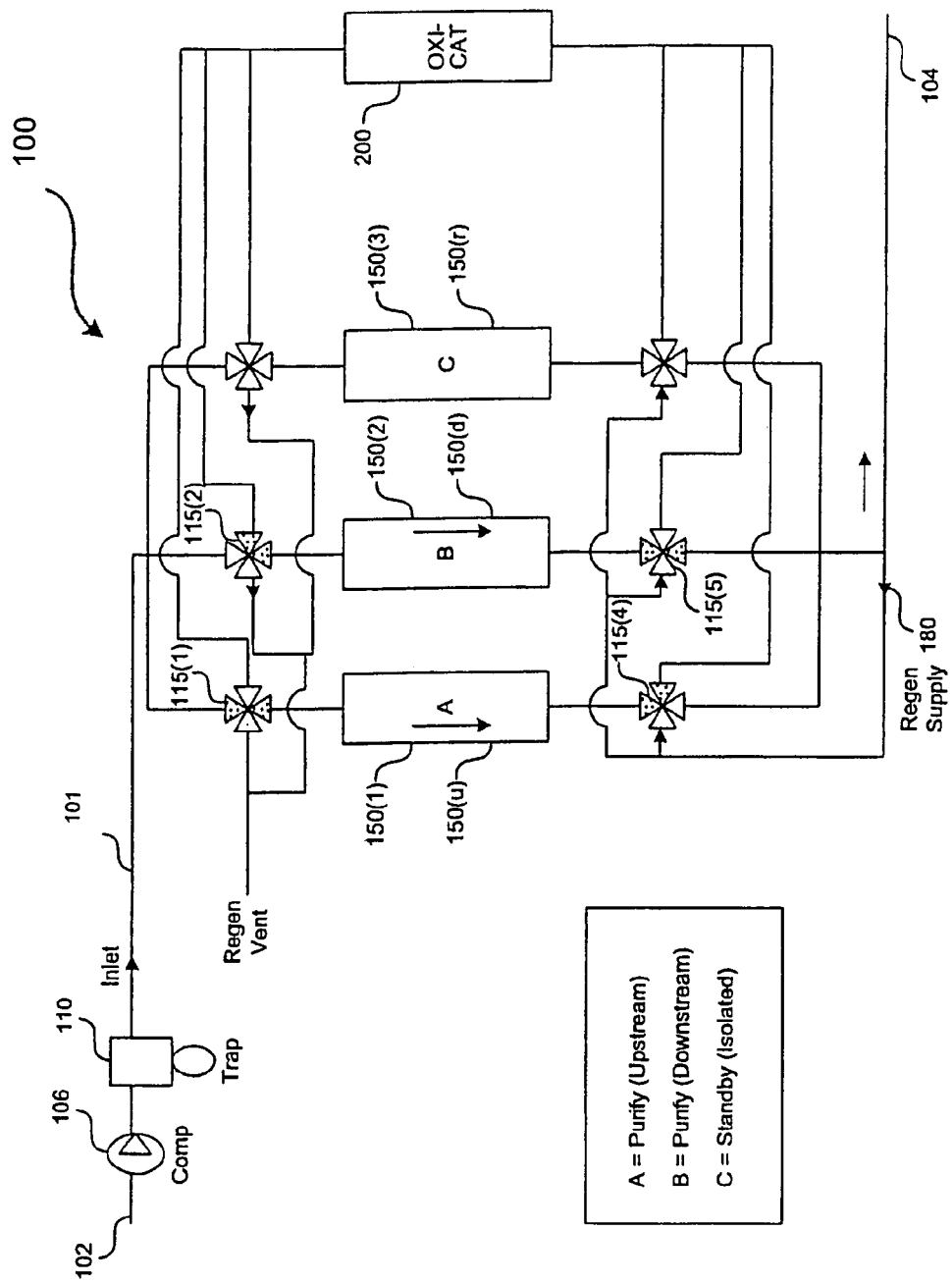
FIG. 7 is a system diagram of the embodiment of the present invention in FIG. 6 with one purifier purifying in a first flow direction (upstream), one purifying unit purifying unit in a second flow direction (downstream) and one purifying unit inactive.

Referring now to FIG. 7, a preferred embodiment of the air purification system 100 in an "active" state is shown. Air is let in through an intake 102 and passed through an optional compressor 106 and then a water trap 110. The water trap 110 will take air that is inlet at standard humidity, i.e. 10-100% relative humidity, and product outlet air that is generally less than 5000 ppm water vapor and is considered "semi-dry" air for the purposes of the present invention.

The "semi-dry" air, at approximately less than 5000 ppm water vapor, passes out of water trap 110. The dry air then enters a first four way diverter valve 115(1), which directs the flow of the "semi-dried" air to the first upstream adsorption column 150($u$), which can be either adsorption column A 150(1), B 150(2), or C 150(3), but for illustrative purposes in FIG. 7 is shown as the adsorption column A 150(1). Air passing upstream through adsorption unit A 150(1) will have remaining moisture and carbon dioxide and other impurities removed. The air then passes out of adsorption unit A 150(1) through 4-way diverter valve 115(4), where it is directed to the oxygen catalyst unit 200. Drying the air before passing it through a first purification unit 150(1) has the effect of extending the life of the purification unit.

The semi clean dry air is flowed through the oxygen catalyst 200, which converts hydrocarbons and carbon monoxide to carbon dioxide and water. The air then passes out of the oxygen catalyst unit 200, and passes to 4-way diverted valve 115(2) where it is directed to adsorption unit B 150(2) 150($d$) where it passes downstream and is purified for the new carbon dioxide and water as well as $NO_x$ for creating purified air. The clean air passes through 4-way diverter valve 115(5) where it is directed to the regeneration supply valve 180; however, most of the air passes through outlet flow 104. The third adsorption column 150(3) 150($s/r$) is inactive and receives no air flow.

Figure 8:
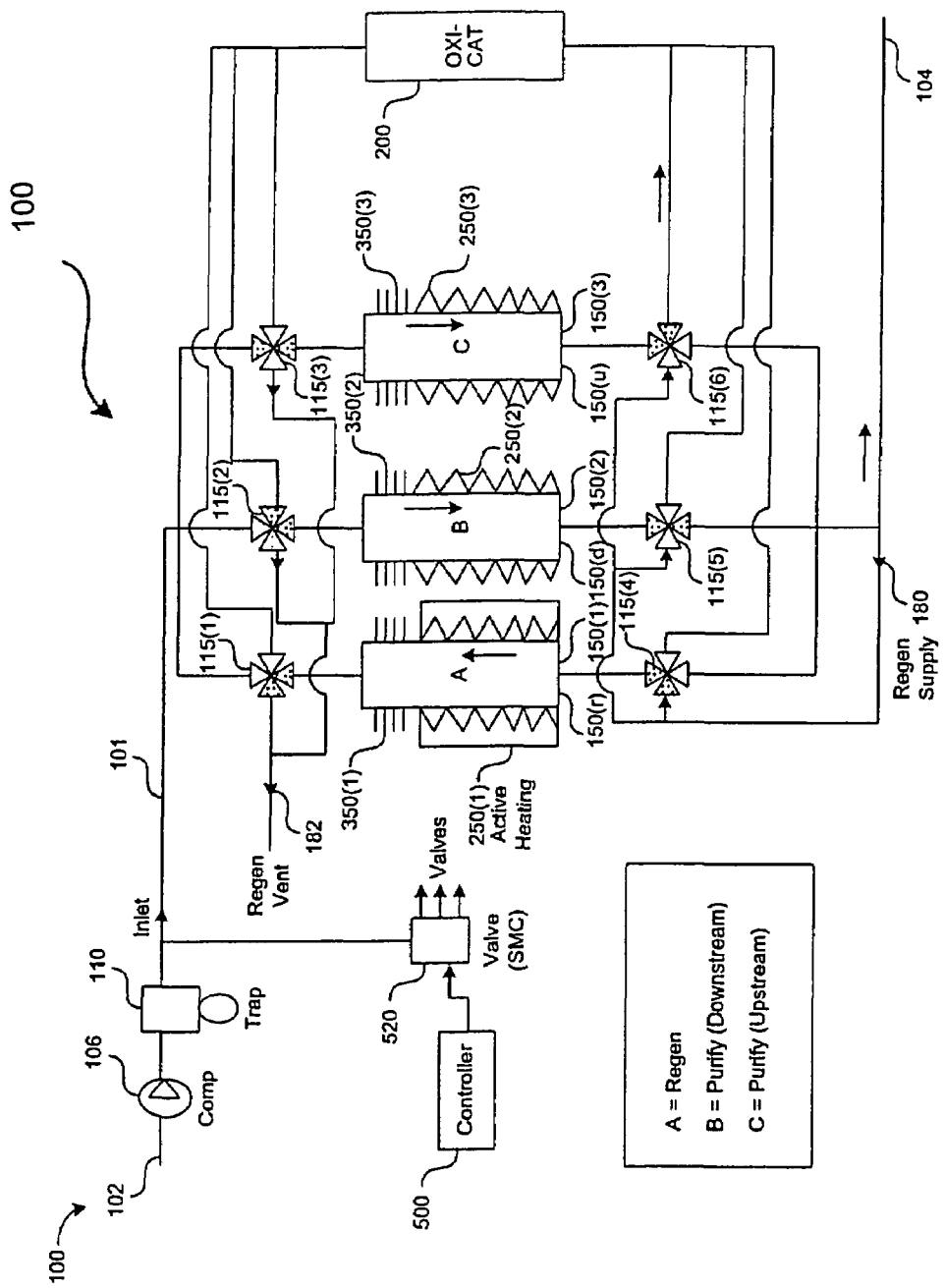
FIG. 8 is a system diagram of the embodiment of the present invention in FIG. 6 with one purifier purifying upstream, one purifying unit purifying unit downstream and one purifying unit regenerating.

Referring now to FIG. 8 a preferred embodiment of the invention is shown in which the adsorption column units A 150(1) 150($r$), B 150(2) 150($d$) and C 150(3) 150($u$) each include a heating means 250(1), 250(2), and 250(3), respectively, and a cooling means 350(1), 350(2), and 350(3), respectively. Such heating and cooling means may be provided in the way of a thermal blanket, gradient type heating, or heat exchanging systems such as a gas-to-gas or gas-to-air heat exchanger. Such structures are well known by those skilled in the art and would reflect the environmental demands of the present invention as it was installed in a particular site and do not need to be detailed here. In addition, FIG. 8 includes and optional control unit 500, and valve operation unit 520, which may be comprised of solenoid valves in a preferred embodiment. Such control structures are generally well known by those skilled in the art and a variety of electrical, mechanical and pneumatic control types would be appropriate based on the installation requirement of the system.

The operation of system 100 is similar to that depicted in FIG. 7. However, now semi-dried air passes from the water trap 110 to 4-way diverted valve 115(3), where it enters adsorption column C 150(3)/150(*u*) for upstream purification. The air enters the column where it is cooled by cooling means 350(3) which are described above, and are well known by the those skilled in the relevant art, help facilitate gas purification in the adsorption column C 150(3). Heating means 250(3) remains either inactive during upstream purification in a preferred embodiment or heats the semi-purified gas as it exits in an alternate embodiment so that it can be more easily heated for the oxygen catalyst unit 200.

The semi-purified air then enters 4-way diverter valve 115 (6) where it is flowed to the oxygen catalyst unit 200, the operation of which is detailed above. The oxygenated semi-purified air leaves the oxygen catalyst unit 200 and flows to 4-way diverted valve 115(2) where it is directed to adsorption column B 150(2)/150(*d*) for purifying in a downstream direction. The gas enters adsorption column B 150(2) where is it is cooled by cooling means 350(2) which facilitates purification of the remaining impurities. The air leaves the adsorption column 150(2)/150(*d*) as purified air and is flowed through the 4-way diverter valve 115(5) to both the outlet 104 and the regeneration supply 180.

Furthermore, in FIG. 8 purified air flows from the regeneration supply 180 into 4-way diverter valve 115(4), where it passes through adsorption unit A 150(1)/150(*r*) which has active heating unit 250(1) activated. The impurities stored in adsorption unit A 150(1) may be released into the purified air, which exits through 4-way diverter valve 115(1) and exits through the regeneration vent 182. The heating unit 250(1) also facilitates thermal regeneration of the adsorption column 150(1) independent of the purified air. In a preferred embodiment the pressure is adjusted in the regenerating column 150(1), in order to facilitate regeneration. The processes of thermal regeneration of adsorption columns are known to those skilled in the art and do not need to be detailed here.

Referring now to FIG. 9, a scheduling schematic detailing the purification, standby, and regeneration cycles through seven sample time periods is shown. The operation of FIG. 9 requires that one column always be purifying in the upstream mode (removing water, carbon dioxide, and other impurities) and one column is always purifying in a downstream manner removing water, carbon dioxide and $NO_x$. In a preferred embodiment, one adsorption column is always either being regenerated or in a standby mode preparing to purify. A column may go to standby mode after regenerating, before becoming active, and when replacing another purifying unit.

In the table depicted in FIG. 9, at time 1, adsorption column A 150(1) is purifying in the upstream mode, adsorption column B 150(2) is purifying in downstream mode and adsorption column C 150(3) is in a standby mode. This state is depicted as represented by FIG. 7. At time period 2, column C 150(3), starts purifying air in an upstream manner and column A 150(1) starts regenerating, while column B 150(2) continues purifying in a downstream manner. At time 3, column A 150(1) goes to standby mode, column B 150(2) continues downstream purifying and column C 150(3) continues upstream purifying. At time 4, column B 150(2) starts the regeneration process, while Column A 150(1) starts purifying in a downstream mode. The cycle continues until all of the adsorption columns have been regenerated.

As can be appreciated by one skilled in the art, the time periods are representative of control cycles and do not represent any particular time period. The time periods to be equal to each and the control cycles of the present invention are shown for sample purposes only and will depend on the environment of the invention.

Figure 10:
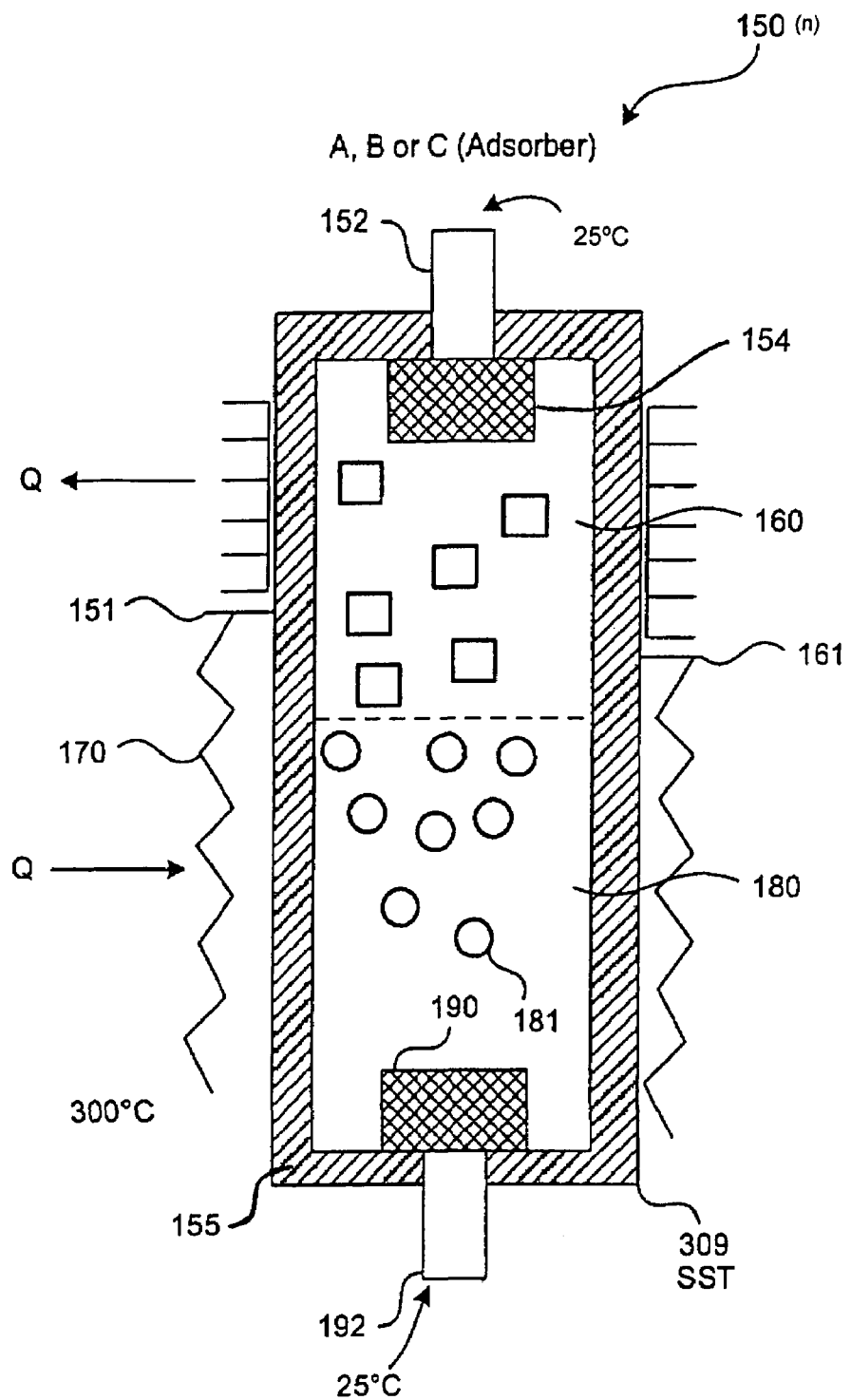
FIG. 10 is a sample purifying unit as used in an embodiment of the present invention.

Referring now to FIG. 10, a regenerable adsorption column 150(*n*), as would be implemented in a preferred embodiment of the present invention, is shown. The adsorption column 150(*n*) includes an outer shell 151 and an insulator 155. In a preferred embodiment, the outer shell is made of 304 SST. The column also includes an intake or first flow connection 152 and a large particle screen 154, which has approximately a 0.05 inch opening in a preferred embodiment. Also included is a mole sieve chamber 160, where a mole sieve 161 is housed. In a preferred embodiment, the molecular sieve 161 is one manufactured by BAYLITH, the specification of which is available from the manufacturer and are incorporated by reference. Another sample molecular sieve 161 used in an alternate embodiment of the present invention is UOP type WE-G 592, of which the technical materials are incorporated by reference.

Also included in the adsorption column 150(*n*) are a primary adsorption chamber 180 which holds an adsorber 181. The adsorber 181 includes 5256 nickel catalyst by ENGLEHARD in a preferred embodiment, but may also include other adsorbers as will be appreciated by those skilled in the art. The technical specifications of the 5256 nickel catalyst are herein incorporated by reference. Also included in the regenerable adsorption column 150(*n*) are an output screen 190, which is a 10 micrometer stainless steel filter by MOTT in preferred embodiment, the details of which are available from the manufacturer and are hereby incorporated by reference, and an outflow or second flow connection 192.

Figure 11:
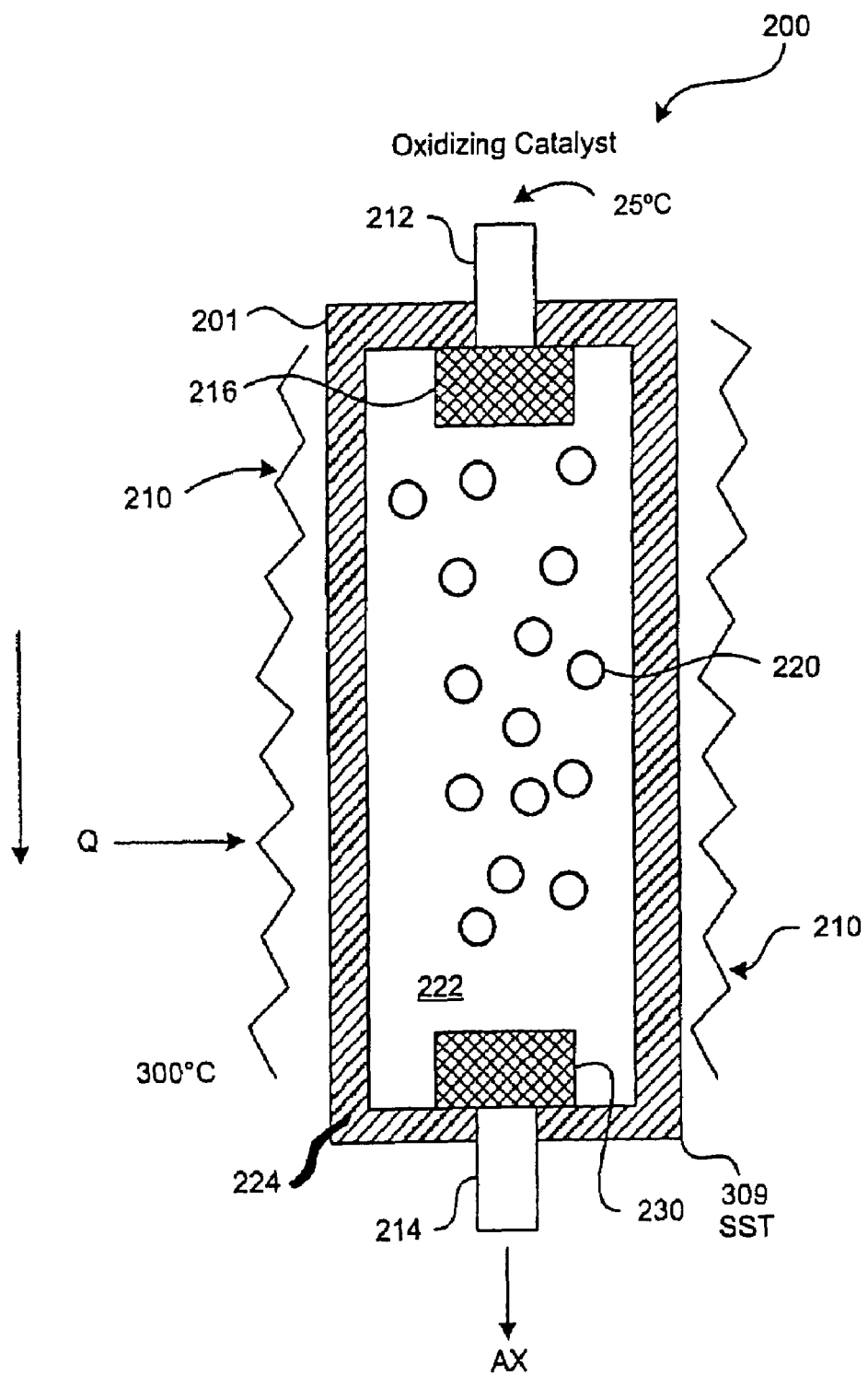
FIG. 11 is a sample oxygen catalyst unit used in an embodiment of the present invention.

Referring now to FIG. 11, an oxygen catalyst unit 200 as used in the present invention is shown. The oxygen catalyst unit 200 is usually kept at approximately 300 degrees centigrade for changing hydrocarbons and carbon monoxide in the air flow received from the upstream adsorption column 150 (*u*) into carbon dioxide and water vapor. The oxygen catalyst unit 200 comprises air intake 212 and outflow 214 units, with heating means 210 covering the unit 200. An intake screen 216 is at the end of the air intake 212, with an opening of approximately 0.05". The air exiting the oxygen catalyst at port 214 also passes through a filter of 10 micrometer (10μ) sintered metal 230. The unit is covered by a shell 201, which in a preferred embodiment is 304 stainless steel, but can be made of other materials and surrounds a secondary layer 224, which surrounds the catalyst chamber 222. The oxidation catalyst 220 sits in the chamber 222.

The oxidation catalyst 220 is usually a palladium (Pd) or platinum (Pt) based catalyst and the technical specifications regarding a catalyst used in the preferred embodiment are incorporated herein by reference. One such catalyst is manufactured by Saes Getters of Milan, Italy, but as can appreciated by those skilled in the relevant art may encompass several different types of catalysts.

The examples given in the specification are not meant to limit the scope of the invention, which, as can be appreciated by those skilled in the art, can have many different implementations and component replacements without departing from the spirit of the invention. These may include, but are not limited to heating devices, cooling devices, valves, tubing, controllers, screens, molecular sieves, nickel catalysts, oxygen catalysts, compressors, water traps, etc. The scope of the invention is better defined by considering the following claims.

The invention claimed is:

1. An air purification system, comprising an air intake, an air outflow, and tubing for directing a flow of air through a combination of system components positioned between said air intake and said air outflow, said system components comprising;
   a water trap for removing water from air entering said air intake;
   a set of adsorption columns comprising a first adsorption column and a second adsorption column;
   a valve for controlling said flow of air between said system components; and
   an oxygen catalyst unit;
      wherein said flow of air directed through said combination of said system components exits said combination as a purified air having an impurity content of 1 ppb or less, and a portion of said purified air is used as a regeneration air to regenerate an adsorption column.

2. The air purification system as recited in claim 1, wherein said first adsorption column includes a first adsorber for each of at least water and carbon dioxide, said oxygen catalyst unit includes a catalyst for oxidizing each of at least hydrocarbons and carbon monoxide into carbon dioxide and water, and said second adsorption column includes a second adsorber for each of at least carbon dioxide, waters, and oxides of nitrogen.

3. The air purification system as recited in claim 1, further comprising an air compressor for compressing said flow of air, wherein said compressor is positioned between said air intake and said water trap.

4. The air purification system as recited in claim 1, wherein at least one of said adsorption columns includes a heating unit.

5. The air purification system as recited in claim 4 wherein said heating unit applies gradient heating to said adsorption column.

6. The air purification system as recited in claim 1, wherein at least one adsorption column includes a cooling unit.

7. The air purification system as recited in claim 6, wherein said cooling unit is a gas-to-gas heat exchanger or a gas-to-air heat exchanger.

8. The air purification system as recited in claim 1, wherein an adsorption column has a first end and a second end, said adsorption column further comprising:
   an outer shell, a molecular sieve, a nickel catalyst, a first filter at a first end of the adsorption column coupled to a first flow connection, and a second filter at a second end of the adsorption column coupled to a second flow connection.

9. The air purification system as recited in claim 8, wherein said adsorption column includes a cooling unit at the first end, said first end in proximity to said first flow connection.

10. The air purification system as recited in claim 8, wherein said adsorption column includes a heating unit at the second end, said heating unit in proximity to said second flow connection.

11. The air purification system as recited in claim 1, wherein said oxygen catalyst unit includes a large particle screen connected to an air intake unit, an oxidizing catalyst, a sintered metal filter connected to a unit air outflow, and a heating means.

12. The air purification system as recited in claim 1 wherein said valve is one of a set of valves that includes four-way diverter valves.

13. The air purification system as recited in claim 12, further comprising a valve control unit for opening and closing said set of valves.

14. The air purification system as recited in claim 13, wherein said valve control unit further comprises control means for directing the flow of air through said first adsorption column in a first flow direction, wherein said control means further comprises means for directing said flow of air through said second adsorption column in a second flow direction, wherein said control means further comprises means for directing said regeneration air from the outflow of said second adsorption column, wherein said regeneration air is flowed through a third adsorption column.

15. The air purification system as recited in claim 1, further including a regeneration air vent.

16. The air purification system as recited in claim 1, further comprised of tubing for directing said regeneration air from the output of said second adsorption column to a third adsorption column.

17. The air purification system as recited in claim 16, wherein the system additionally comprises a regeneration vent, wherein said regenerative air supply flows through said third adsorption column and exits out said regeneration vent.

18. The air purification system as recited in claim 17, further comprising a heating unit, wherein said heating unit facilitates thermal regeneration in said third adsorption column.

19. The air purification system as recited in claim 1, wherein said set of adsorption columns further comprises a third adsorption column having a heating unit, wherein during any time said system is in operation, said third adsorption column is regenerated by directing said regeneration air through said third adsorption column and heating said third adsorption column to facilitate thermal regeneration.

20. The system as recited in claim 1, further including a regeneration air supply intake and a regeneration vent, wherein all of said adsorption columns include a heating unit and are thermally regenerated by heating.

21. The air purification system as recited in claim 1, wherein said set of adsorption columns further comprises a third adsorption column, wherein said first adsorption column removes at least oxides of nitrogen from air.

22. The air purification system as recited in claim 1, wherein said set of adsorption columns further comprises a third adsorption column, wherein said second adsorption column removes at least water vapor, carbon dioxides and oxides of nitrogen from air.

23. The system as recited in claim 1, wherein said oxygen catalyst unit functions to oxidize hydrocarbons and carbon monoxide at approximately 300 degrees centigrade.

24. The system as recited in claim 1, wherein said oxygen catalyst unit includes a catalyst comprising palladium.

25. The system as recited in claim 1, wherein said oxygen catalyst unit includes a catalyst comprising platinum.

26. The system as recited in claim 1, wherein one of said set of adsorption columns includes a catalyst comprising nickel.

27. The system as recited in claim 1, wherein one of said adsorption columns includes a molecular sieve.

28. An air purification system, comprising:
   an air intake, an air outflow, and tubing for directing a flow of air through a combination of system components positioned between the air intake and the outflow, the system components comprising an air compressor, a water trap, a first adsorption column, a second adsorption column, an oxygen catalyst, and a valve for directing the flow of air between the system components;
   wherein, the combination of system components is configured for the flow of air to pass through (1) the air intake, (2) the compressor, (3) the water trap, (4) the first adsorption column, (5) the oxygen catalyst, and (6) the second adsorption column; respectively, to produce a purified air having an impurity content of 1 ppb or less, a portion of which is directed by the valve back to an adsorption column to be used as a regeneration air to regenerate the adsorption column.

29. The system as recited in claim 28, wherein the first adsorption column or second adsorption column comprises an intake, a large particle screen connected to the intake, a sintered metal filter connected to an outflow, and a molecular sieve and a nickel catalyst positioned between the intake and the outflow.

30. The system as recited in claim 28, wherein at least one of the adsorption columns includes a heating unit, a cooling unit, or a combination thereof.

31. The system as recited in claim 28, wherein the oxygen catalyst unit comprises a platinum or palladium catalyst.

32. An air purification system comprising:
an air intake, an air outflow, and tubing for directing a flow of air through a combination of system components positioned between the air intake and the air outflow, the system components comprising an air compressor, a water trap, a first adsorption column, a second adsorption column, a third adsorption column, an oxygen catalyst, and a valve for directing the flow of air between the system components;
wherein, the combination of system components is configured for the flow of air to pass through the (1) air intake; (2) the air compressor; (3) the water trap; (4) one of the first adsorption column, the second adsorption column, or the third adsorption column; (5) the oxygen catalyst; and (6) another of the first adsorption column, the second adsorption column, or the third adsorption column; respectively, to produce a purified air having an impurity content of 1 ppb or less, wherein the remainder of the three adsorption columns is not used for purifying the flow of air during a regeneration cycle, and a portion of the purified air is directed by the valve back to the remaining adsorption column to be used as a regeneration air to regenerate the remaining adsorption column during the regeneration cycle.

33. The air purification system as recited in claim 32, wherein one or more of the adsorption columns includes heating means.

34. The air purification system as recited in claim 32, wherein one or more of the adsorption columns includes cooling means.

35. The air purification system as recited in claim 32, wherein the unused adsorption column has a heating unit for thermally regenerating during the regeneration cycle.

36. The air purification system as recited in claim 32, wherein the unused adsorption column has a cooling unit for cooling the unused adsorption column for removing impurities from the flow of air after the regeneration cycle.

37. The air purification system as recited in claim 32, wherein the unused adsorption column has both a heating unit for thermally regenerating during the regeneration cycle and a cooling unit for cooling the unused adsorption column for removing impurities from the flow of air after the regeneration cycle.

38. The system as recited in claim 37, further including a regeneration air supply intake for providing a purified air to the third adsorption column to remove impurities from the third adsorption column during thermal regeneration or during cooling to further remove impurities from the purified air.

39. The system of claim 2, wherein each of said adsorbers are regenerated using the purified air and the same process conditions.

40. An air purification apparatus, comprising an air intake, an air outflow, and tubing for directing a flow of air through a combination of system components positioned between the air intake and the air outflow, the system components comprising:
a water trap for removing water from air entering the air intake;
a set of adsorption columns comprising a first adsorption column and a second adsorption column;
a valve for controlling the flow of air between the system components; and
an oxygen catalyst unit;
wherein, the first adsorption column and the second adsorption column each comprise a heating unit and a cooling unit, the heating unit functioning to thermally regenerate its respective adsorption column, and the cooling unit functioning to facilitate adsorption of impurities from the flow of air on its respective adsorption column; and, the flow of air exits the combination of system components as a purified air having an impurity content of 1 ppb or less, wherein a portion of the purified air is used as a regeneration air to regenerate an adsorption column in the set of adsorption columns.

41. The apparatus of claim 40, wherein the oxygen catalyst unit oxidizes hydrocarbons and carbon monoxide at approximately 300 degrees centigrade.

42. An apparatus for removing impurities from air, comprising:
system components positioned between an air intake and an air outflow, wherein a flow of air from the air intake to the system components to the air outflow is conducted through a tubing, the system components comprising an air compressor, a water trap, a first adsorption column, an oxygen catalyst unit, a second adsorption column, a third adsorption column, a set of valves, and a regeneration air supply;
wherein, the first adsorption column, second adsorption column, and third adsorption column each comprise a heating unit and a cooling unit; the heating unit functioning to thermally regenerate the respective adsorption column, and the cooling unit functioning to facilitate adsorption of impurities from the flow of air on the respective adsorption column; and,
wherein, the system components are positioned for a flow of air to pass through (1) the air intake; (2) the air compressor; (3) the water trap; (4) one of the first adsorption column, the second adsorption column, or the third adsorption column; (5) the oxygen catalyst unit; (6) another of the first adsorption column, the second adsorption column, or the third adsorption column; respectively, to produce a purified air having an impurity content of 1 ppb or less, wherein the remainder of the three adsorption columns is not used for purifying the flow of air during a regeneration cycle, and a portion of the purified air is directed by the valve back to the remaining adsorption column to be used as a regeneration air to regenerate the remaining adsorption column during the regeneration cycle.

* * * * *